US009796382B2

(12) United States Patent
Sekine et al.

(10) Patent No.: US 9,796,382 B2
(45) Date of Patent: Oct. 24, 2017

(54) DRIVING ASSIST APPARATUS AND DRIVING ASSIST METHOD

(71) Applicants: DENSO CORPORATION, Kariya, Aichi-pref. (JP); HONDA MOTOR CO., LTD., Tokyo (JP)

(72) Inventors: Hiroshi Sekine, Wako (JP); Yutaka Mochizuki, Wako (JP); Takuji Harayama, Wako (JP); Hirotaka Takiguchi, Wako (JP); Daisuke Kondo, Wako (JP); Kiyoshi Tsurumi, Kariya (JP)

(73) Assignees: DENSO CORPORATION, Kariya, Aichi-pref. (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/208,718

(22) Filed: Jul. 13, 2016

(65) Prior Publication Data

US 2017/0015316 A1     Jan. 19, 2017

(30) Foreign Application Priority Data

Jul. 16, 2015   (JP) .............................. 2015-142523

(51) Int. Cl.
*B60W 30/10*    (2006.01)
*G01C 21/26*    (2006.01)
(Continued)

(52) U.S. Cl.
CPC ............ *B60W 30/10* (2013.01); *B60W 10/04* (2013.01); *B60W 10/18* (2013.01); *B60W 10/20* (2013.01);
(Continued)

(58) Field of Classification Search
CPC .... B60W 30/10; B60W 30/045; B60W 10/04; B60W 10/18; B60W 10/20;
(Continued)

(56) References Cited

U.S. PATENT DOCUMENTS

2008/0024266 A1    1/2008   Sekine
2012/0150386 A1*   6/2012   Armbrust ............... G08G 1/166
                                                            701/36
(Continued)

FOREIGN PATENT DOCUMENTS

DE       EP 2653833 A1 * 10/2013 .............. G01C 21/32
DE       EP 2692688 A1 *  2/2014 ............ B66F 17/003
(Continued)

OTHER PUBLICATIONS

Shinko et al., "Turn-Intent Analysis Using Body Pose for Intelligent Driver Assistance," Year: 2006, vol. 5, pp. 28-37.*
(Continued)

*Primary Examiner* — Tuan C. To
(74) *Attorney, Agent, or Firm* — Harness, Dickey & Pierce, P.L.C.

(57) ABSTRACT

A driving assist apparatus is provided. The apparatus includes a curve detection unit that detects a curve ahead of a vehicle, a driving operation assistance unit that, based on the curve detection result, provides driving operation assistance to enable the vehicle to properly pass through the curve, a diversion determination unit that determines whether the vehicle position is diverted from the curve during curve passage, a diversion-confirmed curve storage unit that, when the vehicle position is diverted from the curve, memorizes the curve as a diversion-confirmed curve, and an assistance suppression unit that, when the curve detected by the curve detection unit is the diversion-confirmed curve, suppresses the driving operation assistance by
(Continued)

the driving operation assistance unit. When the vehicle position returns to the curve after diverting from the curve, the diversion determination unit determines that the vehicle position is not diverted from the curve.

5 Claims, 11 Drawing Sheets

(51) Int. Cl.
    *B60W 10/04* (2006.01)
    *B60W 10/18* (2012.01)
    *B60W 10/20* (2006.01)
    *B60W 30/045* (2012.01)

(52) U.S. Cl.
    CPC ........... *B60W 30/045* (2013.01); *G01C 21/26* (2013.01); *B60W 2520/10* (2013.01); *B60W 2520/14* (2013.01); *B60W 2520/16* (2013.01); *B60W 2520/18* (2013.01); *B60W 2550/146* (2013.01); *B60W 2550/402* (2013.01); *B60W 2710/20* (2013.01)

(58) Field of Classification Search
    CPC ..... B60W 2550/146; B60W 2550/402; B60W 2710/20; G01C 21/26; G01C 2520/14; G01C 2520/16; G01C 2520/18
    See application file for complete search history.

(56) References Cited

U.S. PATENT DOCUMENTS

| | | | |
|---|---|---|---|
| 2012/0245817 A1* | 9/2012 | Cooprider | B60W 50/14 701/70 |
| 2013/0024103 A1* | 1/2013 | Schneider | B60W 40/04 701/301 |
| 2013/0038472 A1* | 2/2013 | Gackstatter | B60W 30/0953 340/902 |
| 2014/0044311 A1* | 2/2014 | Takahashi | G08G 1/166 382/103 |
| 2014/0236482 A1* | 8/2014 | Dorum | G01C 21/34 701/533 |
| 2014/0244125 A1* | 8/2014 | Dorum | G01C 21/32 701/70 |
| 2015/0028741 A1* | 1/2015 | Schmidt | G06K 9/00791 315/82 |
| 2015/0094927 A1* | 4/2015 | Takahashi | B60W 30/025 701/93 |
| 2015/0247733 A1 | 9/2015 | Horihata | |
| 2015/0274163 A1* | 10/2015 | Terazawa | B60W 10/20 701/41 |
| 2015/0336574 A1* | 11/2015 | Akiyama | G08G 1/166 701/301 |
| 2016/0003630 A1* | 1/2016 | Higuchi | G08G 1/056 701/41 |
| 2016/0042645 A1* | 2/2016 | Harada | G01S 13/867 701/117 |

FOREIGN PATENT DOCUMENTS

| | | |
|---|---|---|
| JP | 2008-033499 A | 2/2008 |
| JP | 2014074699 A | 4/2014 |

OTHER PUBLICATIONS

JaeMu et al., "An Inexpensive and Accurate Absolute Position Sensor for Driving Assistance," Year: 2008, vol. 57, pp. 864-873.*

* cited by examiner

DRIVING ASSIST APPARATUS AND DRIVING ASSIST METHOD

CROSS REFERENCE TO RELATED APPLICATION

This application is based on Japanese Patent Application No. 2015-142523 filed on Jul. 16, 2015, disclosure of which is incorporated herein by reference.

TECHNICAL FIELD

The present disclosure relates to a technology that detects a curve of a road ahead of a vehicle from map data and assists a driver of the vehicle in passing through the curve.

BACKGROUND ART

When a curve of a road ahead of the vehicle is detected from map data, control can be exercised to provide driving assistance to pass through the curve, for instance, by automatically decelerating the vehicle before the curve and assisting a driver of the vehicle in manipulating a steering wheel in order to obtain an appropriate steering angle.

The shape of a road may be changed by road construction. Therefore, after the creation of map data, bypass road construction may be conducted to eliminate a curve or road improvement construction may be conducted to change a steep curve to a moderate curve. If such a change is not reflected in the map data, a comfort driving operation of the driver may be impaired, for instance, by causing the vehicle to unnecessarily decelerate although there is no curve.

The same situation may arise even when no road construction has been conducted. For example, when a curve of a road ahead of the vehicle is detected by using a dedicated map data analysis program, an erroneous curve detection may occur. In such an instance, too, a comfort driving operation of the driver may be impaired, for instance, by causing the vehicle to unnecessarily decelerate at a place without a curve. Further, as far as the same map data is analyzed, it is highly likely that an erroneous curve detection may occur again when the vehicle passes through the same place. Consequently, a comfort driving operation may be impaired, for instance, by causing the vehicle to unnecessarily decelerate each time it passes through the same place.

Under the above circumstances, a technology proposed, for instance, in Patent Literature 1 determines whether the vehicle is traveling along a curve detected from map data. If the vehicle diverts from the curve detected from the map data, the proposed technology suppresses control that is exercised to assist a driver of the vehicle in passing through the curve when the vehicle will later pass through the curve.

Patent Literature 1: JP4860391B corresponding to US2008/0024266A1

SUMMARY

However, the proposed technology described above may excessively suppress control that is exercised to assist a driver of a vehicle in passing through a curve. Let us suppose that the vehicle is stopped in a parking lot in order to take a rest or do shopping in the middle of a curve. It signifies that the vehicle has diverted from the curve detected from map data. As a result, when the vehicle later passes through the curve, control exercised to assist the driver in passing through the curve is inadvertently suppressed.

In view of the above circumstances, an object of the present disclosure is to provide a technology that is capable of preventing driving assistance control for passing through a curve from being excessively suppressed.

A driving assist apparatus and method according to an aspect of the present disclosure detect a curve of a road ahead of a vehicle from map data. When the vehicle is about to pass through the curve, the driving assist apparatus and method assist a driver of the vehicle to properly pass through the curve. Further, when the vehicle diverts from a curve indicated in the map data, the driving assist apparatus and method memorize the curve as a diversion-confirmed curve. However, if the vehicle returns to the curve after diverting from it, the driving assist apparatus and method do not memorize the curve as a diversion-confirmed curve. When the vehicle passes through a curve memorized as a diversion-confirmed curve, the driving assist apparatus and method suppress assistance that is provided for passing through the curve.

When the vehicle enters a parking lot in the middle of a curve, the above-described driving assist apparatus and method do not memorize the curve as a diversion-confirmed curve. Therefore, when the vehicle later passes through the curve, control exercised to provide driving assistance for passing through the curve is prevented from being suppressed.

The driving assist apparatus can be provided in various ways. For example, a driving assist apparatus in a first aspect detects a curve of a road ahead of a vehicle from map data, provides assistance for a driving operation for passing through the curve, and comprises:

a vehicle position detection unit that detects a vehicle position where the vehicle exists;

a curve detection unit that detects the curve ahead of the vehicle by reading the map data covering a range including the vehicle position;

a driving operation assistance unit that, based on a result of the detection of the curve, provides the assistance for the driving operation in order to enable the vehicle to properly pass through the curve;

a diversion determination unit that determines whether the vehicle position is diverted from the curve during passage along the curve;

a diversion-confirmed curve storage unit that, when the vehicle position is diverted from the curve, memorizes the curve as a diversion-confirmed curve; and an assistance suppression unit that, when the curve detected by the curve detection unit is the diversion-confirmed curve, suppresses the assistance to be provided for the driving operation by the driving operation assistance unit, wherein when the vehicle position returns to the curve after diverting from the curve, the diversion determination unit determines that the vehicle position is not diverted from the curve.

A driving assist apparatus in a second aspect detects a curve of a road ahead of a vehicle from map data, provides assistance for a driving operation for passing through the curve, and comprises:

a vehicle position detection unit that detects a vehicle position where the vehicle exists;

a curve detection unit that detects the curve ahead of the vehicle by reading the map data covering a range including the vehicle position;

a driving operation assistance unit that, based on a result of the detection of the curve, provides the assistance for the driving operation in order to enable the vehicle to properly pass through the curve;

a diversion determination unit that determines whether the vehicle position is diverted from the curve during passage along the curve;

a diversion-confirmed curve storage unit that, when the vehicle position is diverted from the curve, memorizes the curve as a diversion-confirmed curve; and an assistance suppression unit that, when the curve detected by the curve detection unit is the diversion-confirmed curve, suppresses the assistance to be provided for the driving operation by the driving operation assistance unit, wherein when vehicle speed of the vehicle during an interval between diversion of the vehicle position from the curve and return of the vehicle position to the curve is not higher than a predetermined threshold speed, the diversion determination unit determines that the vehicle position is not diverted from the curve.

A driving assist apparatus in a third aspect detects a curve of a road ahead of a vehicle from map data, provides assistance for a driving operation for passing through the curve, and comprises:

a vehicle position detection unit that detects a vehicle position where the vehicle exists;

a curve detection unit that detects the curve ahead of the vehicle by reading the map data covering a range including the vehicle position;

a driving operation assistance unit that, based on a result of the detection of the curve, provides the assistance for the driving operation in order to enable the vehicle to properly pass through the curve;

a diversion determination unit that determines whether the vehicle position is diverted from the curve during passage along the curve;

a diversion-confirmed curve storage unit that, when the vehicle position is diverted from the curve, memorizes the curve as a diversion-confirmed curve; and an assistance suppression unit that, when the curve detected by the curve detection unit is the diversion-confirmed curve, suppresses the assistance to be provided for the driving operation by the driving operation assistance unit, wherein when an absolute value of a travel curvature at a time of diversion of the vehicle position from the curve is larger than a predetermined determination curvature, the diversion determination unit determines that the vehicle position is not diverted from the curve.

A driving assist apparatus in a fourth aspect detects a curve of a road ahead of a vehicle from map data, provides assistance for a driving operation for passing through the curve, and comprises:

a vehicle position detection unit that detects a vehicle position where the vehicle exists;

a curve detection unit that detects the curve ahead of the vehicle by reading the map data covering a range including the vehicle position;

a driving operation assistance unit that, based on a result of the detection of the curve, provides the assistance for the driving operation in order to enable the vehicle to properly pass through the curve;

a diversion determination unit that determines whether the vehicle position is diverted from the curve during passage along the curve;

a diversion-confirmed curve storage unit that, when the vehicle position is diverted from the curve, memorizes the curve as a diversion-confirmed curve; and an assistance suppression unit that, when the curve detected by the curve detection unit is the diversion-confirmed curve, suppresses the assistance to be provided for the driving operation by the driving operation assistance unit, wherein when vehicle speed at a time of diversion of the vehicle position from the curve is smaller than a predetermined threshold speed, the diversion determination unit determines that the vehicle position is not diverted from the curve.

BRIEF DESCRIPTION OF DRAWINGS

The above and other objects, features, and advantages of the present disclosure will become more apparent from the following detailed description made with reference to the accompanying drawings. In the drawings.

DETAILED DESCRIPTION

Embodiments of the present disclosure will now be described.

A. First Embodiment

A-1. Apparatus Configuration

Figure 1:
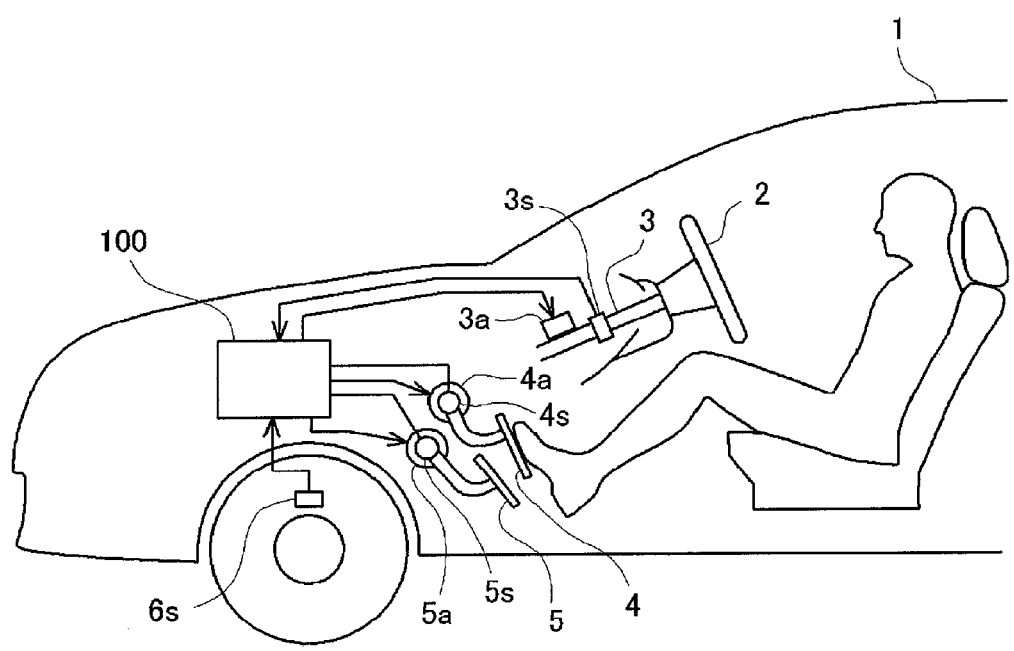
FIG. 1 is a diagram illustrating a vehicle equipped with a driving assist apparatus according to a first embodiment of the present disclosure.

FIG. 1 illustrates a schematic configuration of a vehicle 1 equipped with a driving assist apparatus 100 according to a first embodiment of the present disclosure. As illustrated, the vehicle 1 is equipped with, for example, a steering wheel 2, a steering shaft 3, an accelerator pedal 4, and a brake pedal 5 in addition to the driving assist apparatus 100.

The steering shaft 3 includes a steering angle sensor 3s and a steering wheel drive unit 3a. The steering angle sensor 3s detects the steering angle of the steering wheel 2. The steering wheel drive unit 3a rotationally drives the steering shaft 3. The accelerator pedal 4 includes an acceleration sensor 4s and an accelerator drive unit 4a. The acceleration sensor 4s detects the depression amount of the accelerator pedal 4. The accelerator drive unit 4a drives the accelerator pedal 4. The brake pedal 5 includes a brake sensor 5s and a brake drive unit 5a. The brake sensor 5s detects the depression amount of the brake pedal 5. The brake drive unit 5a drives the brake pedal 5.

The vehicle 1 is further equipped with a vehicle speed sensor 6s. The vehicle speed sensor 6s detects a vehicle speed by detecting the rotation of a tire or an axle.

The driving assist apparatus 100 is connected, for example, to the steering angle sensor 3s, the acceleration sensor 4s, the brake sensor 5s, and the vehicle speed sensor 6s. Further, as described later, the driving assist apparatus 100 includes an orientation detection unit 110, a positioning signal reception unit 111, and a map data storage unit 112. Based on outputs from such units, the driving assist apparatus 100 is capable of detecting, for example, the position of the vehicle 1 (vehicle position) and the position and shape of a curve of a road ahead of the vehicle.

The driving assist apparatus 100 is further connected, for example, to the steering wheel drive unit 3a, the accelerator drive unit 4a, and the brake drive unit 5a. Although described in detail later, when the vehicle 1 passes through a curve, for example, the steering wheel drive unit 3a, the accelerator drive unit 4a, and the brake drive unit 5a can be driven so as to adjust the vehicle speed of the vehicle 1 entering the curve and assist the steering force of the steering wheel 2 or steer the steering wheel 2 so as to obtain an optimum steering angle for passing through the curve.

Figure 2:
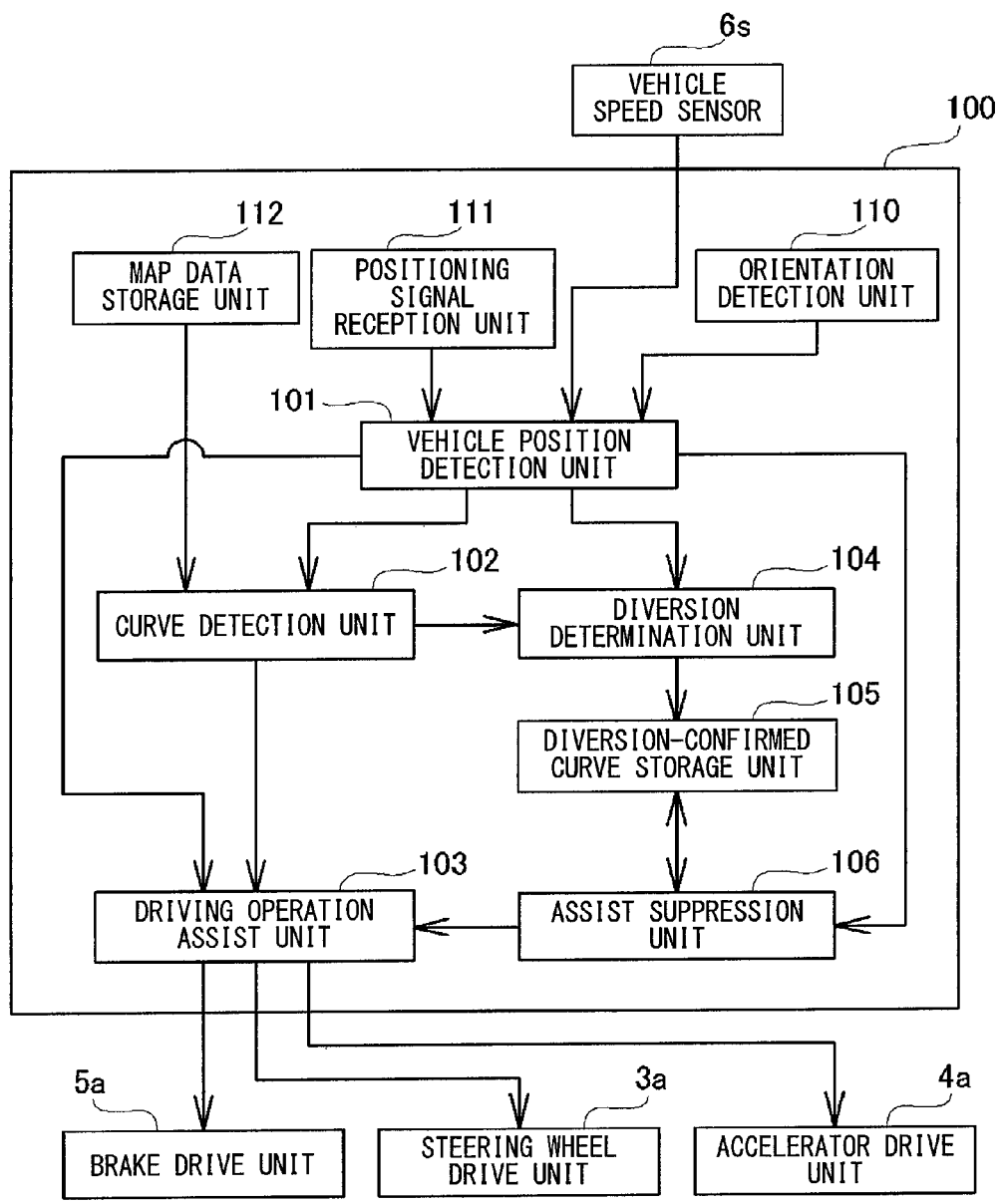
FIG. 2 is a block diagram illustrating an internal configuration of the driving assist apparatus according to the first embodiment.

FIG. 2 schematically illustrates the internal structure of the driving assist apparatus 100 according to the first embodiment. As illustrated, the driving assist apparatus 100 includes a vehicle position detection unit 101, a curve detection unit 102, a driving operation assistance unit 103, a diversion determination unit 104, a diversion-confirmed curve storage unit 105, and an assistance suppression unit 106. The driving assist apparatus 100 further includes the orientation detection unit 110, the positioning signal reception unit 111, and the map data storage unit 112. The orientation detection unit 110 detects the travel direction of the vehicle 1. The positioning signal reception unit 111 receives a signal from a positioning satellite. The map data storage unit 112 stores map data including the shapes of roads. The orientation detection unit 110 may be formed, for instance, of a geomagnetic sensor, which detects geomagnetism to output an absolute orientation, or of a gyro sensor, which detects a change in orientation to output a relative orientation. These "units" are abstract concepts into which the interior of the driving assist apparatus 100 is divided for descriptive purposes while focusing attention on functions exercised by the driving assist apparatus 100 to provide driving assistance for passing through a curve. Thus, the "units" do not signify that the driving assist apparatus 100 is physically divided into the "units". These "units" can be implemented as a computer program executable by a CPU, as an electronic circuit including an LSI and a memory, or by combining them.

The vehicle position detection unit 101 detects the vehicle position, that is, the position of the vehicle (vehicle 1), based on outputs, for instance, from the vehicle speed sensor 6s, the orientation detection unit 110, and the positioning signal reception unit 111. When the vehicle position is to be detected, a road shape read from the map data storage unit 112 may be taken into consideration to increase the accuracy of vehicle position detection.

Upon acquisition of a vehicle position from the vehicle position detection unit 101, the curve detection unit 102 accesses the map data storage unit 112 to read map data covering a range including the vehicle position, and detects a curve ahead of the travel direction of the vehicle. The driving assist apparatus 100 according to the present embodiment is described on the assumption that the map data storage unit 112 is included in the driving assist apparatus 100. However, if a navigation apparatus is mounted in the vehicle 1, the map data may be read from the navigation apparatus instead of the map data storage unit 112. In such an instance, the map data storage unit 112 may be omitted from the driving assist apparatus 100.

The driving operation assistance unit 103 receives the result of vehicle position detection from the vehicle position detection unit 101 and the result of curve detection from the curve detection unit 102. When the vehicle is about to pass through a curve, the driving operation assistance unit 103 assists a driver of the vehicle to properly pass through the curve by driving, for example, the steering wheel drive unit 3a, the accelerator drive unit 4a, and the brake drive unit 5a.

Further, as illustrated in FIG. 1, the driving assist apparatus 100 according to the first embodiment additionally includes the diversion determination unit 104, the diversion-confirmed curve storage unit 105, and the assistance suppression unit 106.

The diversion determination unit 104 compares the vehicle position detected by the vehicle position detection unit 101 against the position of a curve detected by the curve detection unit 102 in order to determine whether the vehicle has diverted from the curve. If it is confirmed that the vehicle has diverted from the curve, the diversion determination unit 104 stores the curve in the diversion-confirmed curve storage unit 105 as a "diversion-confirmed curve".

The assistance suppression unit 106 monitors whether the vehicle position detected by the vehicle position detection unit 101 is about to pass through a curve (diversion-confirmed curve) stored in the diversion-confirmed curve storage unit 105. If the vehicle is about to pass through the diversion-confirmed curve, the assistance suppression unit 106 suppresses or stops the driving assistance to be provided by the driving operation assistance unit 103.

Figure 3A:
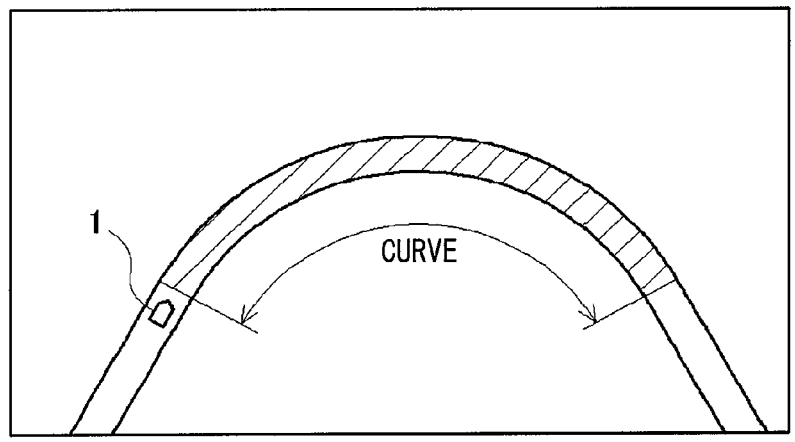
FIG. 3A is a diagram illustrating how the vehicle passes through a curve.
Figure 3B:
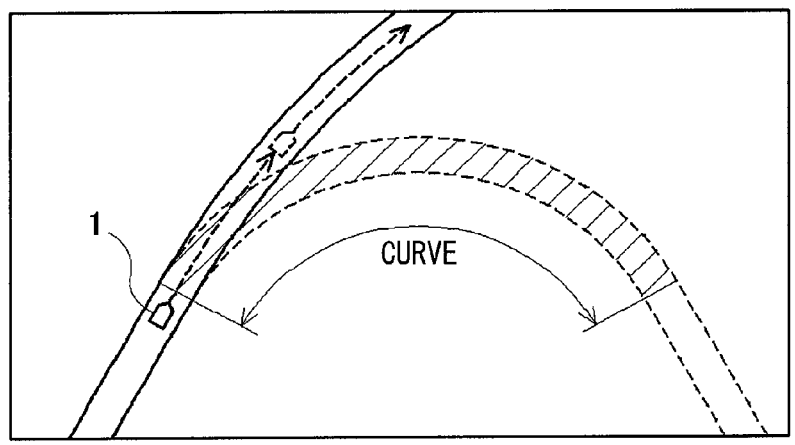
FIG. 3B is a diagram illustrating a case where a diversion-confirmed curve is memorized.
Figure 3C:
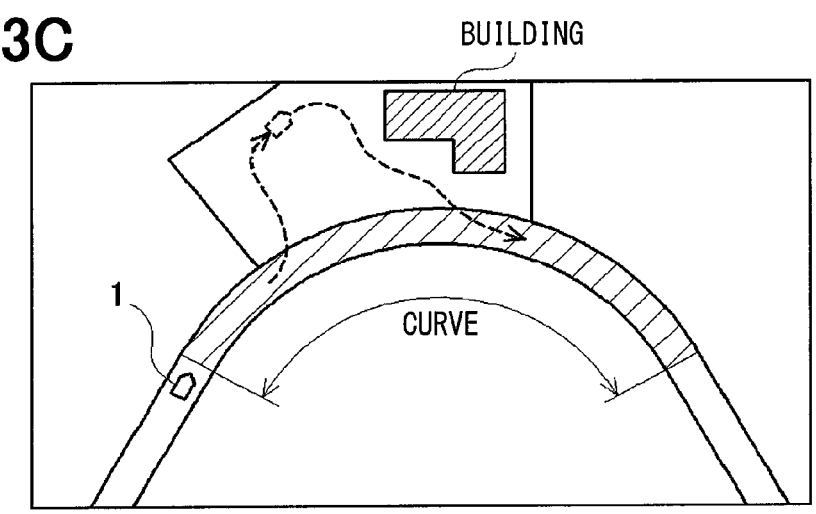
FIG. 3C is a diagram illustrating a case where a diversion-confirmed curve is erroneously memorized.

FIGS. 3A to 3C illustrate how the vehicle 1 having the driving assist apparatus 100 according to the above-described first embodiment passes through a curve. In FIGS. 3A to 3C, the curve is shaded for illustration. When the vehicle 1 is about to pass through the curve as illustrated in FIG. 3A, the driving operation assistance unit 103 (see FIG. 2) operates so as to assist the vehicle 1 to properly pass through the curve, for instance, by automatically reducing the vehicle speed or assisting the steering wheel 2 to provide proper steering.

Meanwhile, road construction may be conducted to change a road by eliminating a curve as illustrated in FIG. 3B. In FIG. 3B, a thin broken line indicates that a curve is eliminated due to a road change. If map data remains unchanged in this instance, the map data shows that the curve indicated by the thin broken line exists. Therefore, the driving operation assistance unit 103 operates to provide unnecessary driving assistance, for instance, by reducing the vehicle speed before the curve.

In reality, however, the vehicle 1 travels as indicated by a thick broken line in FIG. 3B and diverts from the curve, which exists in the map data and is indicated by the thin broken line. Therefore, the diversion determination unit 104 (see FIG. 2) operates to detect a diversion of the vehicle 1 from the curve existing in the map data and store relevant information in the diversion-confirmed curve storage unit 105 (see FIG. 2) in order to indicate that the curve is a diversion-confirmed curve, that is, a curve from which the vehicle 1 diverts due to the inability to travel in accordance with the map data.

Thus, when the vehicle 1 is about to pass through the curve again later, the assistance suppression unit 106 detects that the forthcoming curve detected from the map data is a diversion-confirmed curve, and suppresses or stops the driving assistance to be provided by the driving operation assistance unit 103.

Therefore, when the road is changed to eliminate the curve as illustrated in FIG. 3B and the vehicle 1 is about to pass through the curve for a second time, it is possible to avoid the provision of unnecessary driving assistance, for example, of decelerating the vehicle 1 before the eliminated curve.

However, the vehicle 1 may enter a parking lot existing in the middle of a curve as illustrated in FIG. 3C. If, in such an instance, the curve is memorized as a diversion-confirmed curve, the driving assistance for passing through the curve will not be provided when the vehicle 1 passes through the curve again later.

In order to avoid such a situation, the driving assist apparatus 100 according to the first embodiment performs the following process.

A-2. Curve Passage Assistance Process

Figure 4:
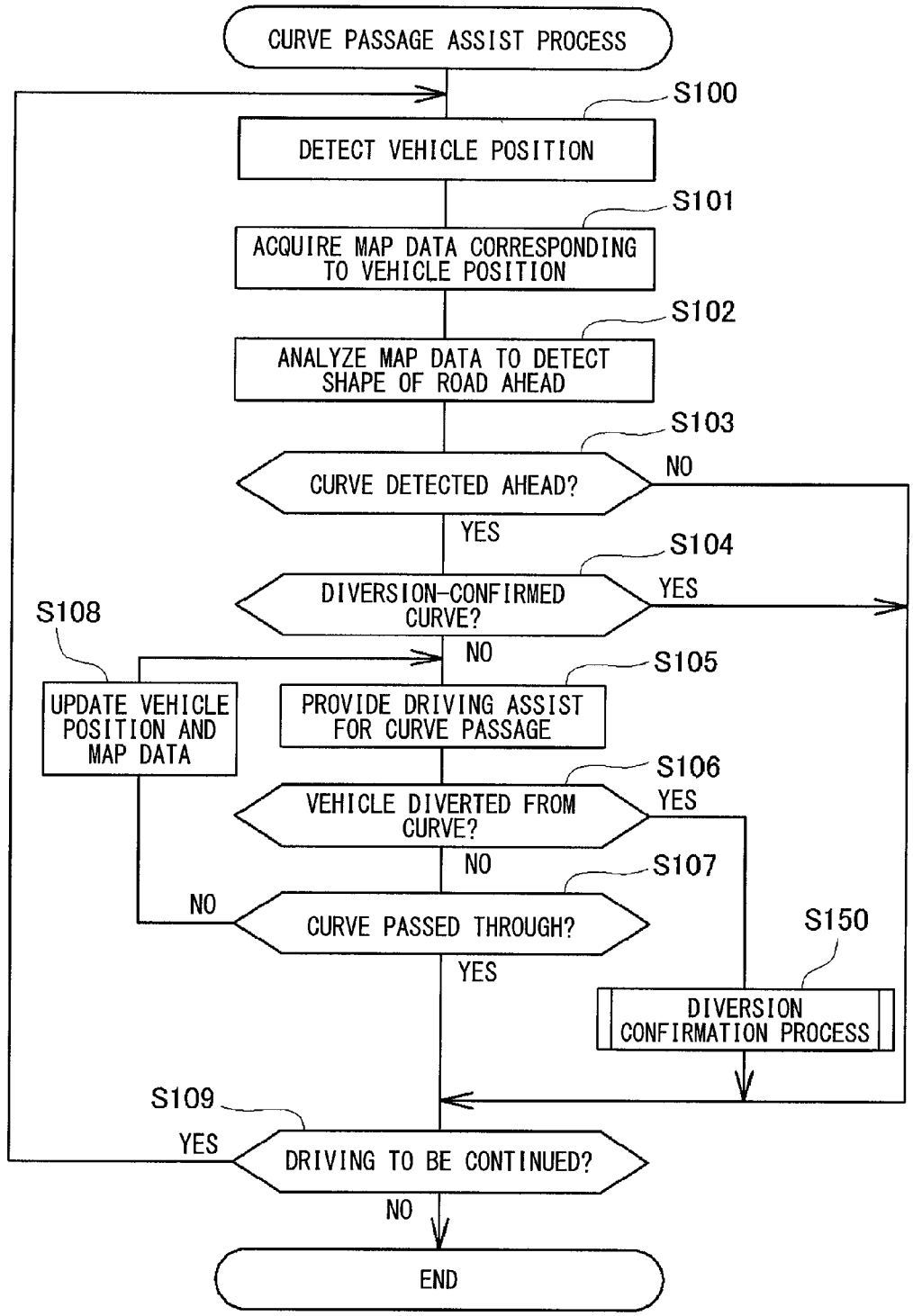
FIG. 4 is a flowchart illustrating a curve passage assistance process that provides driving assistance for passing through a curve.

FIG. 4 is a flowchart illustrating a curve passage assistance process performed by the driving assist apparatus 100 according to the first embodiment.

As illustrated, when the curve passage assistance process starts, the driving assist apparatus 100 detects a vehicle position, that is, the position of the vehicle 1 (vehicle) (S100). The vehicle position can be detected by using a well-known method based on the outputs, for instance, from the vehicle speed sensor 6s, the orientation detection unit 110, and the positioning signal reception unit 111.

Next, the driving assist apparatus 100 acquires map data based on the detected vehicle position from the map data storage unit 112 (S101). In the present embodiment, it is assumed that the driving assist apparatus 100 acquires the map data stored in the map data storage unit 112. However, if a navigation apparatus is mounted in the vehicle 1, the map data may be acquired from the navigation apparatus.

Next, the acquired map data is analyzed to detect the shape of a road ahead of the vehicle (S102). Then, it is determined whether a curve is detected ahead of the vehicle (S103).

If no curve is detected ahead (S103: NO), there is no need to provide driving assistance for passing through a curve. Thus, it is determined whether driving is to be continued (S109). If driving is to be continued (S109: YES), processing proceeds to S100. In S100, the vehicle position is detected again.

If, by contrast, a curve is detected ahead of the vehicle (S103: YES), it is determined whether the curve is a diversion-confirmed curve (S104). When it is confirmed that the vehicle 1 diverts from a curve during its travel although the curve exists in the map data, the curve is referred to as a diversion-confirmed curve. It is conceivable that a diversion-confirmed curve is a curve eliminated due, for instance, to road construction as mentioned with reference to FIG. 3B. Therefore, if a curve is detected ahead (S103: YES) and turned out to be a diversion-confirmed curve (S104: YES), the driving assist apparatus 100 does not provide the driving assistance for passing through the curve.

Whether a curve in the map data is a diversion-confirmed curve cannot be determined until the vehicle 1 actually passes through a place where the curve exists. Consequently, no diversion-confirmed curve is memorized at an initial stage. However, when the vehicle 1 travels through a place where a curve in the map data exists and the curve is confirmed to be a diversion-confirmed curve, the relevant information is stored in a memory built in the driving assist apparatus 100. For the determination in S104, it is determined whether a curve detected ahead of the vehicle is stored in the memory as a diversion-confirmed curve.

Further, if a curve is memorized as a diversion-confirmed curve when the vehicle 1 enters a parking lot in the middle of the curve as mentioned with reference to FIG. 3C, the driving assistance for passing through the curve will not be provided subsequently.

In view of the above circumstances, the driving assist apparatus 100 according to the first embodiment not only confirms the diversion of the vehicle from a curve in the map data, but also confirms by a later-described method that the curve is a diversion-confirmed curve, before storing the curve in the memory as a diversion-confirmed curve, as described below.

If it is determined in S104 of the curve passage assistance process illustrated in FIG. 4 that the forthcoming curve is not a diversion-confirmed curve (S104: NO), driving assistance is provided for passing through the curve (S105). An appropriate passage vehicle speed for passing through the curve is determined based on the shape of the curve detected from the map data, and control is exercised so that the vehicle speed of the vehicle is adjusted for the passage vehicle speed as the vehicle approaches the curve. An alternative is to determine an appropriate steering angle for passing through the curve and drive the steering wheel drive unit 3a to assist the steering force of the steering wheel 2 in such a manner as to obtain an optimum steering angle of the steering wheel 2.

Next, it is determined whether the vehicle has diverted from the curve in the map data (S106). If the vehicle has not diverted from the curve (S106: NO), it is determined whether the vehicle has passed through the curve (S107).

If the vehicle has not passed through the curve (S107: NO), the vehicle position is detected and the map data corresponding to the newly detected vehicle position is read (S108). Upon completion of S108, driving assistance is provided again for passing through the curve (S105).

When the above process is repeated under normal conditions, it will be determined in due time that the vehicle has passed through the curve (S107: YES). Upon completion of S107, it is determined whether driving is to be continued (S109). If driving is to be continued (S109: YES), processing returns to the beginning and detects the vehicle position again (S100). If, by contrast, driving is not to be continued (S109: NO), the curve passage assistance process illustrated in FIG. 4 terminates.

Meanwhile, if the vehicle has diverted from the curve in the map data while driving assistance is provided for passing through the curve (S106: YES), it is conceivable that the curve may be eliminated, for instance, by road construction as illustrated in FIG. 3B. In such an instance, the vehicle should be determined to have diverted from the curve, and the curve should preferably be stored in the memory as a diversion-confirmed curve. However, it is also possible that the vehicle may enter, for instance, a parking lot in the middle of the curve as illustrated in FIG. 3C. In such an instance, it cannot be said that the vehicle has diverted from the curve. Therefore, the curve should not be stored in the memory as a diversion-confirmed curve.

In view of the above circumstances, when the vehicle has diverted from the curve in the map data (S106: YES), a diversion confirmation process (S150) is performed as described below to confirm whether the vehicle has diverted from the curve.

A-3. Diversion Confirmation Process According to First Embodiment

Figure 5:
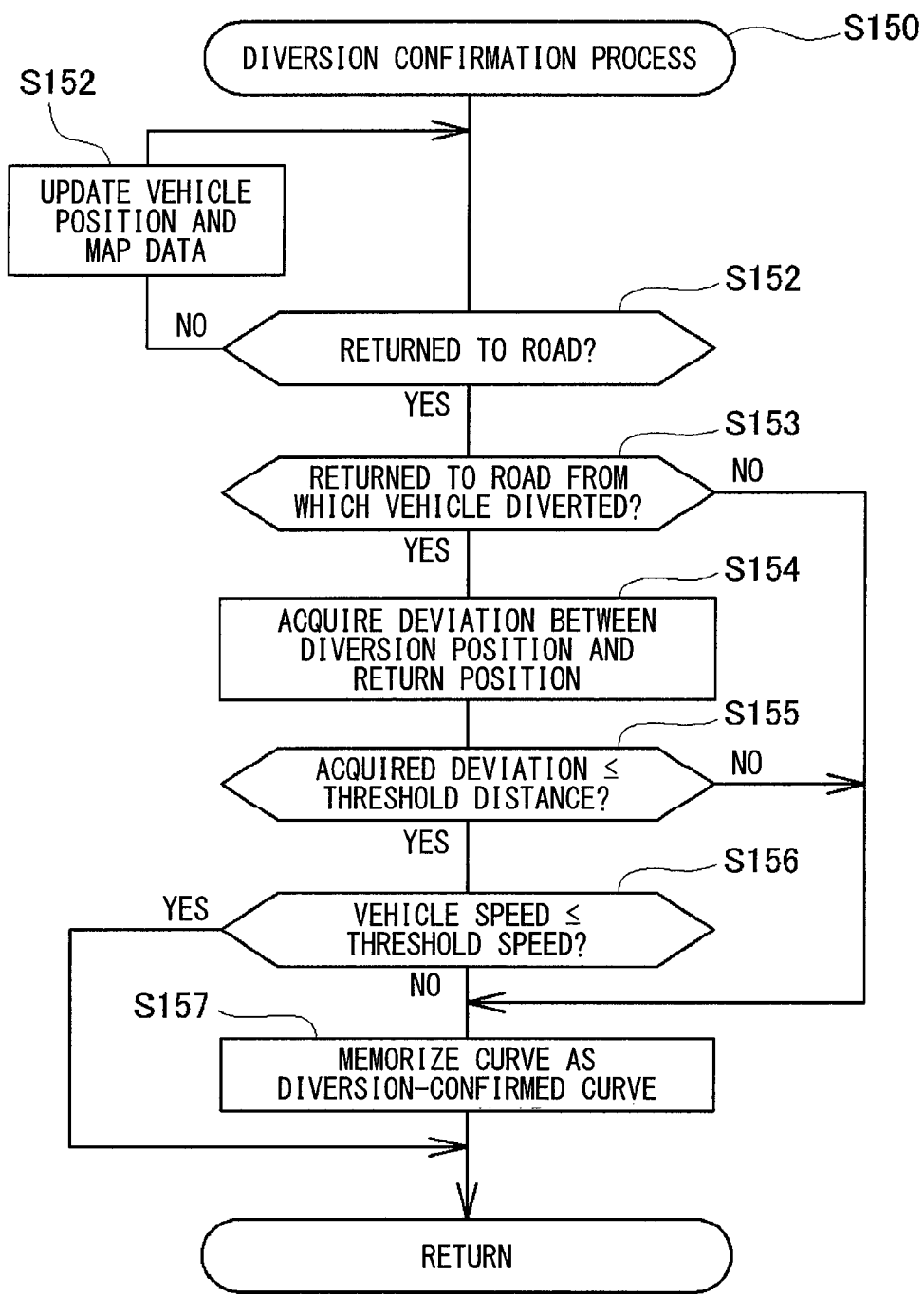
FIG. 5 is a flowchart illustrating a diversion confirmation process according to the first embodiment that is performed to confirm a diversion from a curve during the curve passage assistance process.

FIG. 5 is a flowchart illustrating the diversion confirmation process that is performed by the driving assist apparatus 100 according to the first embodiment. As mentioned earlier, the diversion confirmation process starts when the vehicle has diverted from a curve in the map data during the curve passage assistance process illustrated in FIG. 4.

As illustrated, when the diversion confirmation process according to the first embodiment starts, it is determined whether the vehicle is returned to a road in the map data (S151). The vehicle cannot continue to travel through a place other than a road. Therefore, even if the vehicle diverts from the curve in the map data, the vehicle returns to the road before long. Further, even if the road is replaced by a new one by road construction, the vehicle sooner or later travels along the old road. Consequently, the diversion confirmation process first determines whether the vehicle has returned to the road (S151).

If the vehicle has not returned to the road (S151: NO), the vehicle position is detected anew and the map data corresponding to the newly detected vehicle position is read (S152). Upon completion of S152, it is determined whether the vehicle has returned to the road (S151).

When the above determination sequence is repeated, it will be determined in due time that the vehicle has returned to the road (S151: YES). Upon completion of S151, it is determined whether the road to which the vehicle has returned is a curve from which the vehicle diverted (S153). If the vehicle has returned to a road other than the curve from which the vehicle diverted (S153: NO), it is highly probable that the curve in the map data was changed. Therefore, the curve is stored in the memory of the driving assist apparatus 100 as a diversion-confirmed curve in order to suppress the driving assistance that is to be provided for later passage through the curve (S157).

If, by contrast, the vehicle has returned to a road that is the curve from which the vehicle diverted (S153: YES), the following sequence is performed for confirmation.

First of all, the deviation between a diversion position and a return position is acquired (S154). The diversion position is a position from which the vehicle diverted. The return position is a position at which the vehicle returned to the curve. The deviation to be acquired may be a straight-line distance between the diversion position and the return position or a distance traveled when the vehicle moves from the diversion position to the return position along a road in the map data.

Next, it is determined whether the acquired deviation is equal to or smaller than a predetermined threshold distance (S155). If the deviation between the diversion position and the return position is greater than the threshold distance (S155: NO), it is possible that the curve in the map data may be changed. Therefore, the curve is stored in the memory as a diversion-confirmed curve even if the vehicle returns to the curve from which the vehicle diverted (S157).

If, by contrast, the deviation between the diversion position and the return position is equal to or smaller than the threshold distance (S155: YES), it is determined whether the vehicle speed from the instant at which the vehicle diverted from the curve to the instant at which the vehicle returned to the curve is equal to or lower than a predetermined threshold speed (S156). The threshold speed is set to a speed, for instance, of 10 km/hr that seems to be excessively low for traveling on a common road.

Consequently, if the vehicle speed between the diversion from the curve and the return to the curve is equal to or lower than the predetermined threshold speed (S156: YES), it is conceivable that the vehicle entered, for instance, a parking lot in the middle of the curve, as illustrated in FIG. 3C. In such an instance, the diversion confirmation process illustrated in FIG. 5 terminates without storing the curve in the memory as a diversion-confirmed curve, and processing returns to the curve passage assistance process illustrated in FIG. 4.

If, by contrast, the vehicle speed between the diversion from the curve and the return to the curve is higher than the threshold speed (S156: NO), it is probable that there is a change in the curve from the curve in the map data. Thus, the curve is stored in the memory as a diversion-confirmed curve (S157). Upon completion of S157, the diversion confirmation process illustrated in FIG. 5 terminates, and processing returns to the curve passage assistance process illustrated in FIG. 4.

Figure 6:
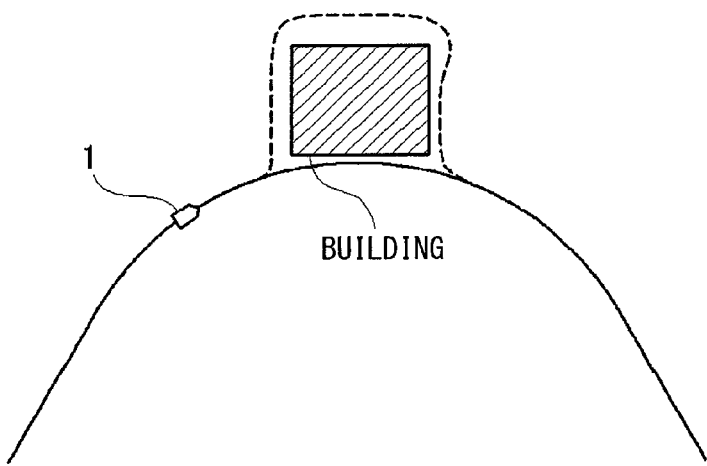
FIG. 6 is a diagram illustrating how the erroneous memorization of a diversion-confirmed curve is avoided by the diversion confirmation process according to the first embodiment.

As described above, even when the vehicle has diverted from a curve in the map data, the driving assist apparatus 100 according to the first embodiment does not always memorize the curve as a diversion-confirmed curve. The driving assist apparatus 100 according to the first embodiment performs the diversion confirmation process, which is described above with reference to FIG. 5, to confirm that the curve is a diversion-confirmed curve, and then stores the curve in the memory. Therefore, when the vehicle enters a parking lot in the middle of the curve as illustrated in FIG. 3C or enters a drive-through in the middle of the curve as illustrated in FIG. 6, the curve will not be memorized as a diversion-confirmed curve. Consequently, when the vehicle later passes through the curve, driving assistance can be provided for passing through the curve.

When all the relevant conditions are established, that is, when the vehicle returns to a curve from which the vehicle diverted (S153 in FIG. 5: YES), the deviation between the diversion position and the return position is equal to or smaller than the threshold distance (S155: YES), and the vehicle speed between the diversion and the return is equal to or lower than the threshold speed (S156: YES), the above-described diversion confirmation process according to the first embodiment does not memorize the curve as a diversion-confirmed curve. Conversely, if not all the above conditions are established, the curve is memorized as a diversion-confirmed curve. Therefore, if it is possible that the curve is eliminated, the above-described diversion confirmation process according to the first embodiment works to suppress the driving assistance to be provided for passing through the curve.

However, when the above process is performed, a curve in the map data may be memorized as a diversion-confirmed curve although the curve actually exists, and it is possible that the driving assistance for passing through the curve may not be provided.

Therefore, if the vehicle travels along a curve in the map data when the vehicle passes through the curve memorized as a diversion-confirmed curve for a second time, it is preferred that the memorized diversion-confirmed curve for that curve be deleted from the memory.

A-4. Diversion Confirmation Process According to Modification of First Embodiment As described above, when the vehicle has diverted from a curve, the diversion confirmation process according to the first embodiment memorizes the curve as a diversion-confirmed curve wherever possible. This is based on an idea that if there is a possibility of a curve having been eliminated, the driving assistance for passing through the curve should be suppressed wherever possible to let the driver drive the vehicle in an appropriate manner.

On the contrary, however, there may be an idea that even when the vehicle has diverted from a curve, the curve should not be memorized as a diversion-confirmed curve if the curve is not highly likely to have been eliminated. That is to say, there may be an idea that the driving assistance for passing through the curve should preferably be suppressed if the curve is highly likely to have been eliminated and should preferably be provided in a different situation. The diversion confirmation process according to a modification of the first embodiment that is based on the above idea will be described below.

Figure 7:
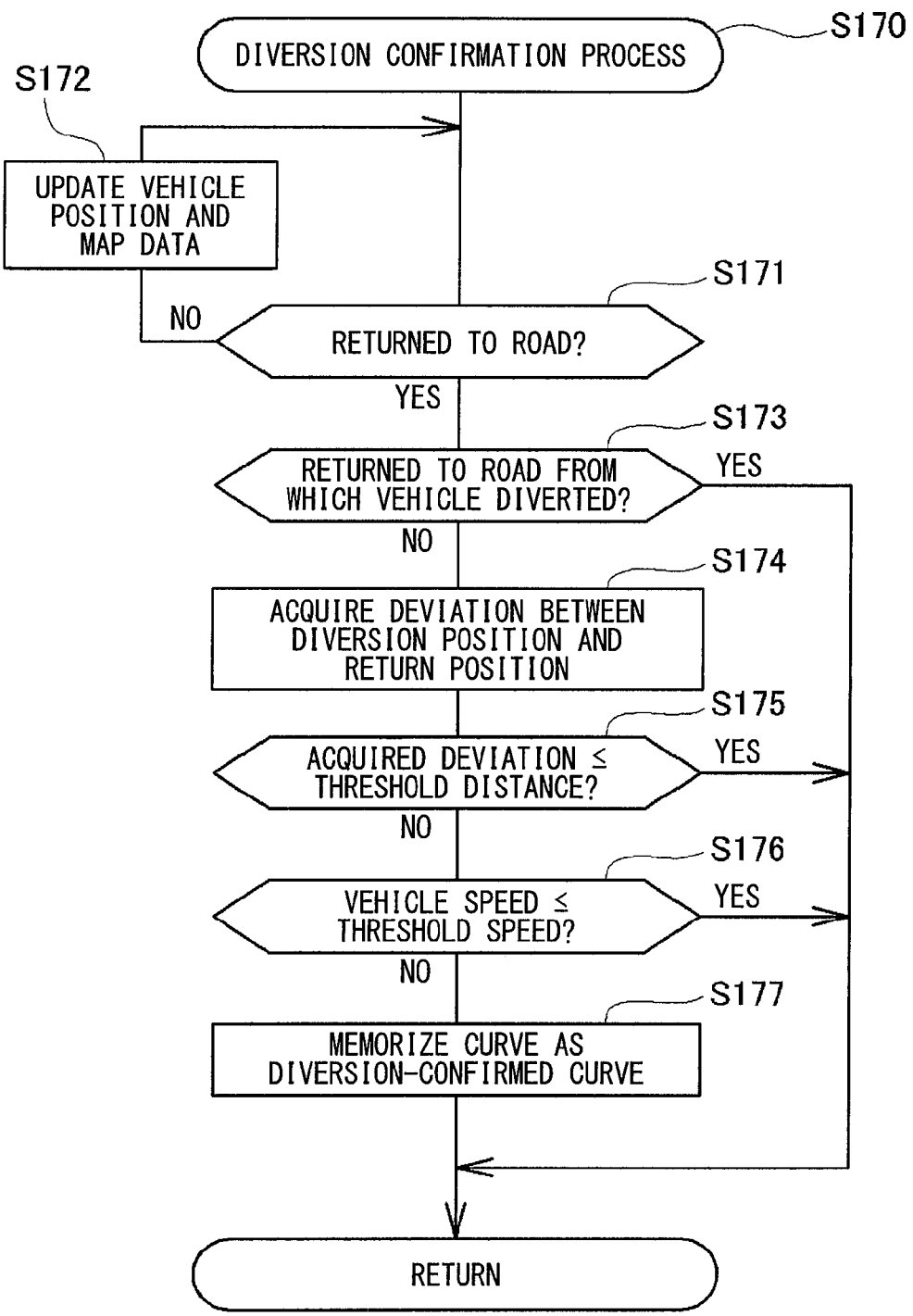
FIG. 7 is a flowchart illustrating the diversion confirmation process according to a modification of the first embodiment.

FIG. 7 is a flowchart illustrating the diversion confirmation process that is performed by the driving assist apparatus 100 in accordance with the modification of the first embodiment. This diversion confirmation process is performed in place of the earlier-described diversion confirmation process according to the first embodiment (S150) during the curve passage assistance process illustrated in FIG. 4.

As is the case with the earlier-described diversion confirmation process according to the first embodiment, the diversion confirmation process according to the modification begins with determining whether the vehicle is returned to the road (S171).

If the result of determination does not indicate that the vehicle is returned to the road (S171: NO), the vehicle position is detected anew and the map data corresponding to the newly detected vehicle position is read (S172), as is the case with the diversion confirmation process according to the first embodiment. Upon completion of S712, it is again determined whether the vehicle is returned to the road (S171).

When the above determination sequence is repeated, it will be determined in due time that the vehicle is returned to the road (S171: YES). Upon completion of S171, it is determined whether the road to which the vehicle has returned is a curve from which the vehicle diverted (S173). If the vehicle has returned to the curve from which the vehicle diverted (S173: YES), it is conceivable that the curve in the map data still remains. In this instance, the diversion confirmation process according to the modification illustrated in FIG. 7 terminates without storing the curve in the memory of the driving assist apparatus 100 as a diversion-confirmed curve, and processing returns to the curve passage assistance process illustrated in FIG. 4.

If, by contrast, the vehicle has returned to a road other than the curve from which the vehicle diverted (S173: NO), the deviation between the diversion position from which the vehicle diverted and the return position at which the vehicle returned to the road is acquired (S174) to determine whether the acquired deviation is equal to or smaller than the predetermined threshold distance (S175). The deviation according to the modification may be a straight-line distance between the diversion position and the return position or a distance traveled along a road in the map data, as is the case with the earlier-mentioned deviation according to the first embodiment.

If the deviation between the diversion position and the return position is smaller than the threshold distance (S175: YES), it is conceivable that the vehicle returned to the road at the end of the curve, and that the curve in the map data still remains. Thus, in this instance, too, the diversion confirmation process according to the modification illustrated in FIG. 7 terminates without memorizing the curve as a diversion-confirmed curve, and processing returns to the curve passage assistance process illustrated in FIG. 4.

If, by contrast, the deviation between the diversion position and the return position is greater than the threshold distance (S175: NO), it is determined whether the vehicle speed between the diversion from the curve and the return to the road is equal to or lower than the predetermined threshold speed (S176). As is the case with the earlier-mentioned threshold speed according to the first embodiment, the threshold speed according to the modification is set to a speed, for instance, of 10 km/hr that seems to be excessively low for traveling on a common road.

If the vehicle speed between the diversion from the curve and the return to the road is equal to or lower than the threshold speed (S176: YES), it is conceivable that the vehicle did not travel along a common road but entered, for instance, a parking lot in the middle of the curve. Thus, in this instance, too, the diversion confirmation process according to the modification illustrated in FIG. 7 terminates without memorizing the curve as a diversion-confirmed curve, and processing returns to the curve passage assistance process illustrated in FIG. 4.

If, by contrast, the vehicle speed between the diversion from the curve and the return to the road is higher than the threshold speed (S176: NO), the vehicle is unlikely to have entered, for instance, a parking lot in the middle of the curve, and it is possible that the curve in the map data is changed. In this instance, therefore, the diversion confirmation process according to the modification illustrated in FIG. 7 terminates after storing the curve in the memory as a diversion-confirmed curve (S177), and processing returns to the curve passage assistance process illustrated in FIG. 4.

Figure 8:
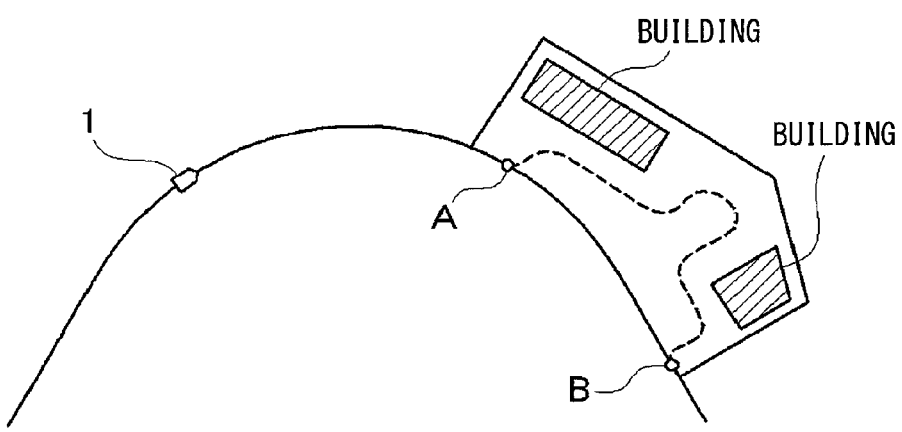
FIG. 8 is a diagram illustrating how the erroneous memorization of a diversion-confirmed curve is avoided by the diversion confirmation process according to the modification of the first embodiment.

When the vehicle has diverted from a curve in the map data, the above-described diversion confirmation process according to the modification of the first embodiment memorizes the curve as a diversion-confirmed curve after thorough confirmation. Therefore, even if the vehicle enters, for instance, a parking lot in the middle of the curve, the curve is not memorized as a diversion-confirmed curve. The example shown, for instance, in FIG. 8 indicates that the vehicle 1 entered a parking lot. Point A, which represents the diversion position, is on the curve, but point B, which represents the return position, is on a road that, is not included in the curve. Even in such an instance, the diversion confirmation process according to the modification of the first embodiment does not memorize the curve as a diversion-confirmed curve.

Consequently, when the vehicle later passes through the curve, the driving assistance for passing through the curve is provided. Therefore, the vehicle can safely pass through the curve.

The first embodiment described earlier with reference to FIG. 5 memorizes a curve as a diversion-confirmed curve if any one of three conditions is established, that is, if a road to which the vehicle returned is the curve from which the vehicle diverted (S153), the deviation between the diversion position and the return position is equal to or smaller than the threshold distance (S155) or the vehicle speed was equal to or lower than the threshold speed (S156).

Meanwhile, the modification of the first embodiment described with reference to FIG. 7 memorizes the curve as a diversion-confirmed curve if none of the three conditions is established, that is, if the road to which the vehicle returned is not the curve from which the vehicle diverted (S173), the deviation between the diversion position and the return position is greater than the threshold distance (S175), or the vehicle speed was higher than the threshold speed (S176).

However, an alternative is to memorize the curve as a diversion-confirmed curve merely when a certain one condition among a plurality of conditions is established and to memorize the curve as a diversion-confirmed curve when none of the other conditions is established.

For example, the certain one condition among the conditions may be that the deviation between the diversion position and the return position is equal to or smaller than the threshold distance, and the other conditions may be that the deviation between the diversion position and the return position is equal to or smaller than the threshold distance and that the vehicle speed was equal to or smaller than the threshold speed is established. If this certain one condition is established, the curve may be memorized as a diversion-confirmed curve. If none of the other conditions are established, the curve may be memorized as a diversion-confirmed curve.

When a plurality of conditions are appropriately combined as suggested by the above alternative, whether or not to memorize the curve as a diversion-confirmed curve can be determined more appropriately.

B. Second Embodiment

When the vehicle has diverted from a curve, the first embodiment and the modification of the first embodiment determine, without using information about the actual travel path of the vehicle, whether or not to memorize the curve as a diversion-confirmed curve. However, the information about the actual travel path of the vehicle may be used for determination. A driving assist apparatus 200 according to a second embodiment of the present disclosure, which uses such information for determination, will be described below with a focus on the difference from the driving assist apparatus 100 according to the earlier-described first embodiment.

B-1. Apparatus Configuration

Figure 9:
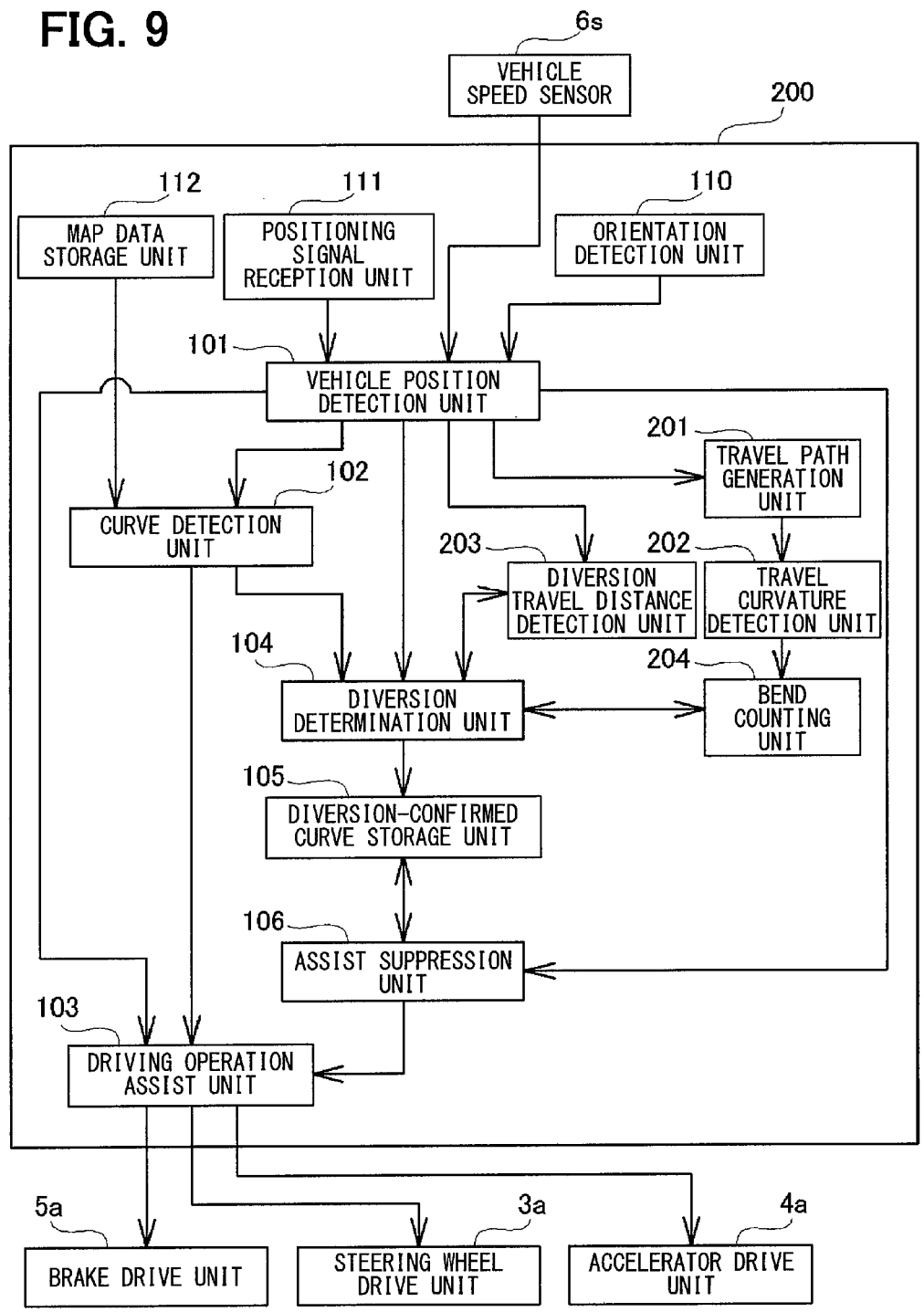
FIG. 9 is a block diagram illustrating an internal configuration of the driving assist apparatus according to a second embodiment of the present disclosure.

FIG. 9 schematically illustrates the internal structure of the driving assist apparatus 200 according to the second embodiment. As illustrated, the driving assist apparatus 200 according to the second embodiment includes a travel path generation unit 201, a travel curvature detection unit 202, a diversion travel distance detection unit 203, and a bend counting unit 204 in addition to the units included in the driving assist apparatus 100 according to the first embodiment described with reference to FIG. 2.

More specifically, in the driving assist apparatus 200 according to the second embodiment, too, the vehicle position detection unit 101 detects the position of the vehicle 1 (vehicle), that is, the vehicle position, the curve detection unit 102 references the map data to detect a curve ahead of the vehicle, and the driving operation assistance unit 103 provides driving assistance for passing through the curve detected from the map data. If, in this instance, it is confirmed that the vehicle has diverted from a curve, the curve is stored in the diversion-confirmed curve storage unit 105 as a diversion-confirmed curve. When the vehicle later passes through a place having the curve, the assistance suppression unit 106 suppresses the driving assistance provided by the driving operation assistance unit 103.

The travel path generation unit 201, which is added to the driving assist apparatus 200 according to the second embodiment, generates the actual travel path of the vehicle (vehicle 1) by cumulatively storing the vehicle position detected by the vehicle position detection unit 101.

The travel curvature detection unit 202 detects the curvature (travel curvature) by analyzing the actual travel path generated by the travel path generation unit 201. As the curvature and the curvature radius are in reciprocal relationship to each other, the curvature radius may be detected instead of the curvature.

Upon receipt of information indicative of the diversion of the vehicle from a curve, the diversion travel distance detection unit 203 cumulatively stores the distance traveled by the vehicle in accordance with vehicle position information from the vehicle position detection unit 101 in order to detect a travel distance (diversion travel distance) that is traveled to return to a road.

The bend counting unit 204 counts the number of times (bend count) the travel curvature detected by the diversion travel distance detection unit 203 exceeds a predetermined threshold curvature during an interval between the diversion of the vehicle from the curve and the return of the vehicle to the road.

When the diversion of the vehicle from a curve is detected, the diversion determination unit 104 in the driving assist apparatus 200 according to the second embodiment determines, based on the diversion travel distance detected by the diversion travel distance detection unit 203 and on the bend count measured by the bend counting unit 204, whether or not to store the curve in the diversion-confirmed curve storage unit 105 as a diversion-confirmed curve.

As a result, when the vehicle has diverted from a curve in the map data, it is possible to properly determine whether the driving assistance for curve passage should be provided for the curve when the vehicle later passes through the curve.

The above-mentioned diversion confirmation process performed by the driving assist apparatus 200 according to the second embodiment will be described below.

B-2. Diversion Confirmation Process According to Second Embodiment

Figure 10:
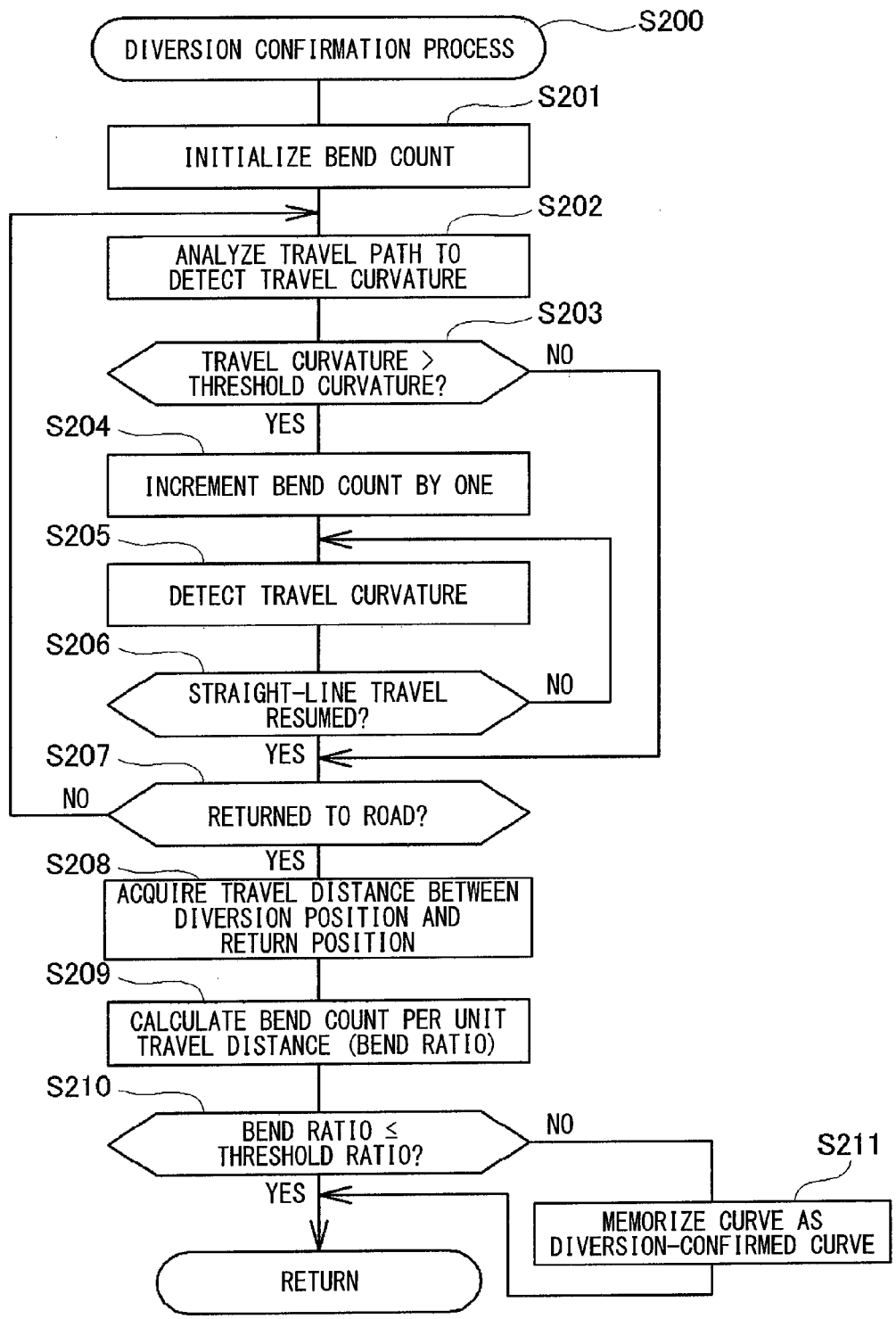
FIG. 10 is a flowchart illustrating the diversion confirmation process according to the second embodiment.

FIG. 10 is a flowchart illustrating the diversion confirmation process performed by the driving assist apparatus 200 according to the second embodiment. This process is performed in place of the earlier-described diversion confirmation process according to the first embodiment (S150) when the vehicle is determined to have diverted from a curve during the curve passage assistance process illustrated in FIG. 4 (S106: YES).

The diversion confirmation process (S200) according to the second embodiment starts by initializing the bend count (S201). The bend count is the number of times the predetermined threshold curvature is exceeded by the curvature of the actual travel path of the vehicle. When the vehicle is diverted from a curve, the diversion confirmation process according to the second embodiment uses a bent count measured between the diversion from the curve and the return to a road to determine whether or not to memorize the curve as a diversion-confirmed curve. Therefore, the bend count is initialized at the start of the diversion confirmation process in order to measure the bent count.

Next, the actual travel path generated by cumulatively storing the vehicle position is analyzed to detect the travel curvature of the vehicle (S202).

Subsequently, it is determined whether the absolute value of the detected travel curvature is greater than a predetermined threshold curvature (S203). If the absolute value is greater than the predetermined threshold curvature (S203: YES), the bend count is incremented by one (S204). After the bend count is incremented by one, the travel curvature is detected again from the actual travel path (S205), and it is determined whether the vehicle has resumed a straight-line travel (S206). When the vehicle has resumed a straight-line travel is determined based on whether the absolute value of the travel curvature is equal to or smaller than the predetermined threshold curvature. This determination sequence is performed in order to avoid repeated measurements of the same bend. That is to say, the measured bend count should be "1" no matter whether the vehicle 5 remains in a right-turning state for a prolonged period of time. The determination sequence is performed to avoid repeated measurements in such an instance.

If the vehicle has not resumed a straight-line travel (S206: NO), the travel curvature of the vehicle is detected again (S205) to determine whether the vehicle has resumed a straight-line travel (S206). When the vehicle is determined to have resumed a straight-line travel (S206: YES) while the above sequence is repeated, it is determined whether the vehicle has returned to a road in the map data (S207). If the result of determination does not indicate that the vehicle has returned to the road (S207: NO), the travel curvature is detected again (S202) to determine whether the detected travel curvature is greater than the threshold curvature (S203). If the detected travel curvature is greater than the threshold curvature (S203: YES), the bend count is incremented by one (S204). Upon completion of S204, the aforementioned series of steps (S206 and S207) is performed. If, by contrast, the detected travel curvature is smaller than the threshold curvature (S203: NO), it is determined, without incrementing the bend count by one, to determine whether the vehicle has returned to the road.

When the above processing sequence is repeated, the vehicle sooner or later returns to the road in the map data. Thus, the query in S207 is answered "YES".

When it is determined that the vehicle has returned to the road (S207: YES), the distance (travel distance) the vehicle has traveled between the diversion from the curve to the return to the road is acquired (S208). The travel distance may be determined from the actual travel path of the vehicle or calculated based on the output from the vehicle speed sensor 6s.

Next, the bend count per unit travel distance (bend ratio) is calculated by dividing the measured bend count by the travel distance (S209). The bend ratio is calculated for the following reason.

If the vehicle has diverted from a curve in the map data due to a road change applied, for instance, by road construction, it signifies that the vehicle is actually traveling on a road although the road is not registered in the map data. As far as the vehicle is traveling on the road, the vehicle does not frequently turn left or right to the extent that the travel curvature becomes greater than the threshold curvature. It is therefore conceivable that the bend ratio is low.

If, by contrast, the vehicle has diverted from a curve in order to enter, for instance, a parking lot, it is conceivable that the vehicle repeatedly turns left and right during its short travel. In this instance, therefore, the bend ratio is high.

Consequently, whether the vehicle has diverted from a curve because of a road change or an entry into a parking lot in the middle of the curve can be determined by calculating the bend ratio during an interval between the diversion of the vehicle from the curve and the return of the vehicle to the road. For this reason, the bend ratio is calculated in S209.

Next, it is determined whether the calculated bend ratio is equal to or lower than a predetermined threshold value (S210). If the bend ratio is equal to or lower than the threshold value (S210: YES), it is conceivable that the vehicle has diverted from the curve in order to enter, for instance, a parking lot. Thus, the diversion confirmation process according to the second embodiment illustrated in FIG. 10 terminates without storing the curve in the memory as a diversion-confirmed curve, and processing returns to the curve passage assistance process illustrated in FIG. 4.

If, by contrast, the bend ratio is higher than the threshold value (S210: NO), the curve is stored in the memory as a diversion-confirmed curve (S211). Upon completion of S211, the diversion confirmation process according to the second embodiment illustrated in FIG. 10 terminates, and processing returns to the curve passage assistance process illustrated in FIG. 4.

Figure 11A:
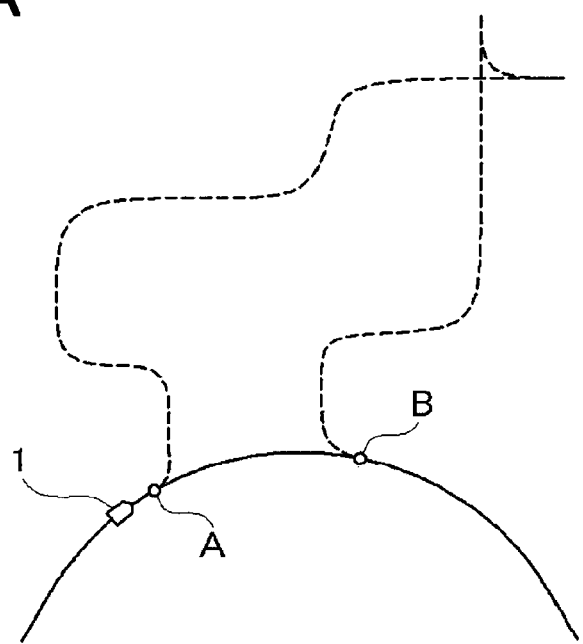
FIG. 11A is a diagram illustrating a case where a vehicle stops in a parking lot.

As described above, when the vehicle has diverted from a curve in the map data, the diversion confirmation process according to the second embodiment determines, based on the bend ratio calculated from the actual travel path, whether or not to memorize the curve as a diversion-confirmed curve. Therefore, whether the curve should be memorized as a diversion-confirmed curve can be properly determined. The example of FIG. 11A shows a case where the vehicle 1 entered a parking lot. In such a case, the bend ratio during an interval between the diversion position (point A) and the return position (point B) is high. Thus, even if the vehicle has diverted from a curve, the curve is not memorized as a diversion-confirmed curve.

Figure 11B:
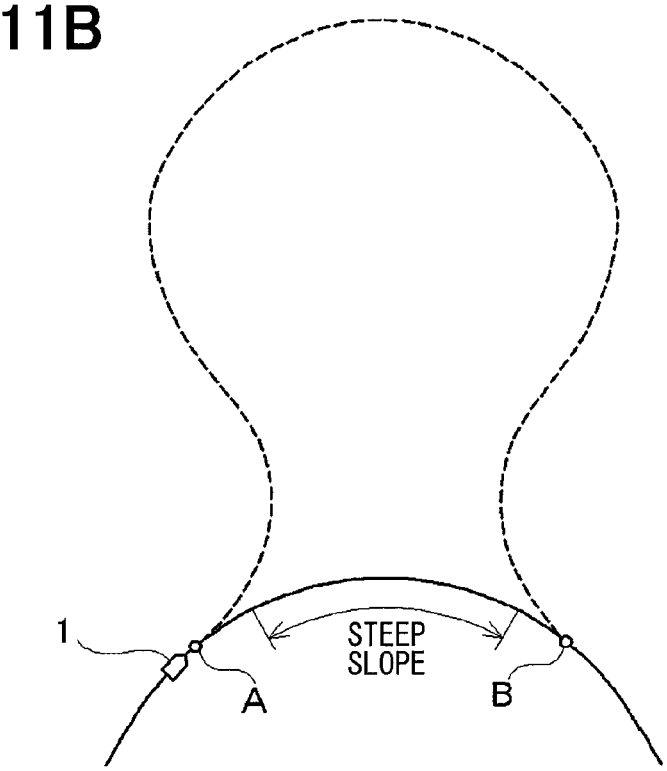
FIG. 11B is a diagram illustrating how the erroneous memorization of a diversion-confirmed curve is avoided by the diversion confirmation process according to the second embodiment.

Meanwhile, the example of FIG. 11B shows a case where a new road indicated by a broken line has replaced a curve including a steep slope. In such a case, the bend ratio during an interval between the diversion position (point A) and the return position (point B) is low. Thus, it can be determined that the vehicle has diverted from the curve because the curve is replaced by the new road. Therefore, the curve can be memorized as a diversion-confirmed curve. As a result, when the vehicle later passes through the curve, it is possible to prevent driving assistance from being provided at an inappropriate time, for instance, for deceleration.

When the vehicle has diverted from a curve, the second embodiment described above uses information about the actual travel path of the vehicle to determine whether or not to memorize the curve as a diversion-confirmed curve. The first embodiment and its modification described earlier make a determination based on information, for instance, about the distance between the diversion position and the return position or the vehicle speed during an interval between the diversion and the return instead of the actual travel path of the vehicle. Obviously, whether the curve should be memorized as a diversion-confirmed curve may be determined by using the information about the actual travel path of the vehicle as described in conjunction with the second embodiment as well as using the information about the distance between the diversion position and the return position or about the vehicle speed during an interval between the diversion and the return as described in conjunction with the first embodiment and its modification. The use of these methods makes it possible to determine more accurately whether or not to memorize a curve as a diversion-confirmed curve when the vehicle has diverted from the curve.

C. Third Embodiment

When determining whether or not to memorize a curve as a diversion-confirmed curve, the above described first embodiment, modification of the first embodiment and second embodiment focus attention on how the vehicle (vehicle 1) diverting from the curve has returned to the curve or a road.

However, a simple method would be to focus attention on how the vehicle has diverted from the curve and determine whether or not to memorize the curve as a diversion-confirmed curve. The diversion confirmation process according to a third embodiment of the present disclosure, which uses the above-mentioned simple method, will be described below.

Figure 12:
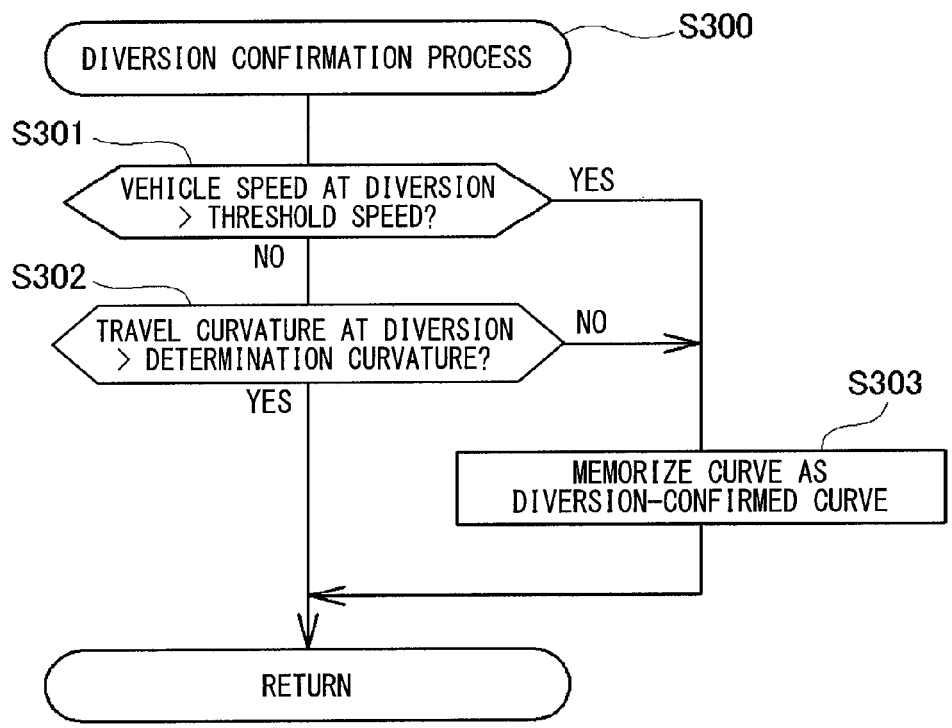
FIG. 12 is a flowchart illustrating the diversion confirmation process according to the second embodiment.

FIG. 12 is a flowchart illustrating the diversion confirmation process according to the third embodiment. As is the case with the diversion confirmation process according to the second embodiment, which has been described earlier with reference to FIG. 10, the diversion confirmation process according to the third embodiment is performed in place of the earlier-described diversion confirmation process (S150) according to the first embodiment when the curve passage assistance process illustrated in FIG. 4 determines that the vehicle has diverted from a curve (S106: YES).

As illustrated in FIG. 12, the diversion confirmation process (S300) according to the third embodiment determines whether the vehicle speed of the vehicle diverting from the curve is higher than a predetermined threshold speed (S301). The threshold speed is set to a speed, for instance, of 30 km/hr that seems to be excessively high for moving in a parking lot.

Therefore, if the vehicle speed of the vehicle diverting from the curve is higher than the threshold speed (S301: YES), it is conceivable that the vehicle has diverted from the curve in order to travel on a road created, for instance, by road construction. Thus, the curve is stored in the memory as a diversion-confirmed curve (S303).

If, by contrast, the vehicle speed of the vehicle diverting from the curve is lower than the threshold speed (S301: NO), it is determined whether the travel curvature at the time of diversion from the curve is greater than a predetermined determination curvature (S302).

The travel curvature can be determined by generating the actual travel path of the vehicle with the travel path generation unit 201 described earlier with reference to FIG. 9 and analyzing the generated actual travel path with the travel curvature detection unit 202.

Alternatively, the travel curvature may be determined from the output of the steering angle sensor 3s. In this instance, the apparatus configuration can be simplified because there is no need to equip the travel path generation unit 201 and the travel curvature detection unit 202.

The determination curvature is set to a curvature excessively great for a curved portion of a road (for example, a curvature obtained when the curvature radius is 10 m). Thus, if the travel curvature at the time of diversion from the curve is greater than the determination curvature (S302: YES), it is conceivable that the vehicle has diverted from the curve in order not to travel on a road created, for instance, by road construction but to enter, for example, a parking lot. In this instance, therefore, the diversion confirmation process according to the third embodiment terminates without storing the curve in the memory as a diversion-confirmed curve, and processing returns to the curve passage assistance process illustrated in FIG. 4.

If, by contrast, the travel curvature at the time of diversion from the curve is smaller than the determination curvature (S302: NO), it is conceivable that the vehicle has diverted from the curve in order to travel on a road created, for instance, by road construction. In this instance, therefore, the diversion confirmation process according to the third embodiment terminates after storing the curve in the memory as a diversion-confirmed curve (S303), and processing returns to the curve passage assistance process illustrated in FIG. 4.

Figure 13:
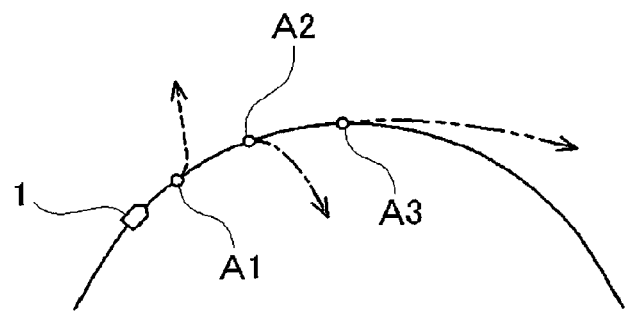
FIG. 13 is a diagram illustrating how the erroneous memorization of a diversion-confirmed curve is avoided by the diversion confirmation process according to a third embodiment of the present disclosure.

FIG. 13 illustrates a plurality of different diversions of the vehicle 1 from a curve. If the vehicle 1 diverted from point A1 in FIG. 13 and traveled along a path indicated by a broken line arrow, the travel curvature at the time of diversion is greater than the determination curvature. If the vehicle 1 diverted from point A2 in FIG. 13 and traveled along a path indicated by a one-dot chain line arrow, the travel curvature at the time of diversion is also greater than the determination curvature.

If the diversion of the vehicle 1 is as described above, it is conceivable that the vehicle 1 entered, for instance, a parking lot in the middle of the curve. Therefore, even if the vehicle 1 diverts from the curve, the curve is not memorized as a diversion-confirmed curve.

Meanwhile, if the vehicle 1 diverted from point A3 in FIG. 13 and traveled along a path indicated by a two-dot chain line, the travel curvature at the time of diversion is smaller than the determination curvature. Therefore, if the diversion of the vehicle 1 is as described above, the vehicle 1 is unlikely to have entered, for example, a parking lot, and it is highly probable that a road change is applied. If the vehicle 1 entered a parking lot, it is likely that the vehicle 1 decelerated before entering the parking lot. Therefore, whether the vehicle 1 entered, for example, a parking lot can be determined by comparing the vehicle speed at the time of diversion from the curve against the threshold speed.

Consequently, when the vehicle 1 has diverted from a curve, the above-described diversion confirmation process according to the third embodiment can properly determine whether or not to store the curve in the memory as a diversion-confirmed curve. As a result, it is possible to avoid a situation where the driving assistance for passing through the curve is not provided although the curve actually exists as indicated in the map data, or conversely, the driving assistance for passing through the curve is provided although the curve does not actually exist.

Additionally, when the vehicle 1 has diverted from a curve, the above-described diversion confirmation process according to the third embodiment can determine, based on the manner of diversion, whether or not to store the curve in the memory as a diversion-confirmed curve. Thus, the manner of return to a road need not be taken into consideration. This simplifies the process of determination and makes it possible to reduce a processing burden.

Various embodiments including a modification have been described for illustration purposes. However, embodiments of the present disclosure are not limited to the foregoing embodiments. For example, a function possessed by one element in a foregoing embodiment may be divided into the functions of a plurality of elements, and functions possessed by a plurality of elements may be integrated into a function of one element. Further, at least a part of a foregoing embodiment may be replaced by a configuration having the same functionality. Furthermore, a configuration of a foregoing embodiment may be partly omitted. Moreover, at least a part of a configuration of a foregoing embodiment may be, for example, added to a configuration of another embodiment or replaced by a configuration of another embodiment.

What is claimed is:

1. A driving assist apparatus for detecting a curve of a road ahead of a vehicle from map data and providing assistance for a driving operation for passing through the curve, the driving assist apparatus comprising:
    a vehicle position detection unit that detects a vehicle position where the vehicle exists;
    a curve detection unit that detects the curve ahead of the vehicle by reading the map data covering a range including the vehicle position;
    a driving operation assistance unit that, based on a result of the detection of the curve, provides the assistance for the driving operation in order to enable the vehicle to properly pass through the curve;
    a diversion determination unit that determines whether the vehicle position is diverted from the curve during passage along the curve;
    a diversion-confirmed curve storage unit that, when the vehicle position is diverted from the curve, memorizes the curve as a diversion-confirmed curve; and
    an assistance suppression unit that, when the curve detected by the curve detection unit is the diversion-confirmed curve, suppresses the assistance to be provided for the driving operation by the driving operation assistance unit,
    wherein
    when the vehicle position returns to the curve after diverting from the curve, the diversion determination unit determines that the vehicle position is not diverted from the curve.

2. The driving assist apparatus according to claim 1, wherein
    when a deviation between a diversion position and a return position is equal to or smaller than a threshold distance, the diversion determination unit determines that the vehicle is not diverted from the curve,
    the diversion position being a position at which the vehicle position diverts from the curve,
    the return position being a position where the vehicle position returns to the curve.

3. The driving assist apparatus according to claim 1, wherein
    when vehicle speed of the vehicle during an interval between diversion of the vehicle position from the curve and return of the vehicle position to the curve is not higher than a predetermined threshold speed, the diversion determination unit determines that the vehicle position is not diverted from the curve.

4. The driving assist apparatus according to claim 1, further comprising:
    a travel path generation unit that generates an actual travel path of the vehicle in accordance with the vehicle position;
    a travel curvature detection unit that detects a curvature of the actual travel path as a travel curvature;
    a bend counting unit that measures a bend count during an interval between diversion of the vehicle from the curve and return of the vehicle to the curve, the bend count being the number of times the travel curvature exceeds a predetermined threshold curvature; and
    a diversion travel distance detection unit that detects a diversion travel distance, the diversion travel distance being a distance traveled by the vehicle during the interval between the diversion of the vehicle from the curve and the return of the vehicle to the curve,
    wherein
    when a ratio of the bend count to the diversion travel distance measured during the interval between the diversion of the vehicle from the curve and the return of the vehicle to the curve is equal to or greater than a predetermined threshold value, the diversion determination unit determines that the vehicle is not diverted from the curve.

5. A driving assist method for detecting a curve of a road ahead of a vehicle from map data and providing assistance for a driving operation for passing through the curve, the driving assist method comprising:
    a vehicle position detection step of detecting a vehicle position where the vehicle exists;
    a curve detection step of detecting a curve ahead of the vehicle by reading the map data covering a range including the vehicle position;
    a driving operation assistance step of, based on a result of the detection of the curve, providing the assistance for the driving operation in order to enable the vehicle to properly pass through the curve;
    a diversion determination step of determining whether the vehicle position is diverted from the curve during passage along the curve;
    a diversion-confirmed curve memorizing step of memorizing the curve as a diversion-confirmed curve when the vehicle position is diverted from the curve; and
    an assistance suppression step of suppressing the assistance to be provided for the driving operation by the driving operation assistance unit when the curve detected by the curve detection unit is the diversion-confirmed curve,
    wherein
    when the vehicle returns to the curve after diverting from the curve, the diversion-confirmed curve memorizing step determines that the vehicle is not diverted from the curve.

* * * * *